April 30, 1946.　　　J. R. SNYDER　　　2,399,516
QUICK DISCONNECT COUPLING
Filed Oct. 11, 1943　　　3 Sheets-Sheet 1
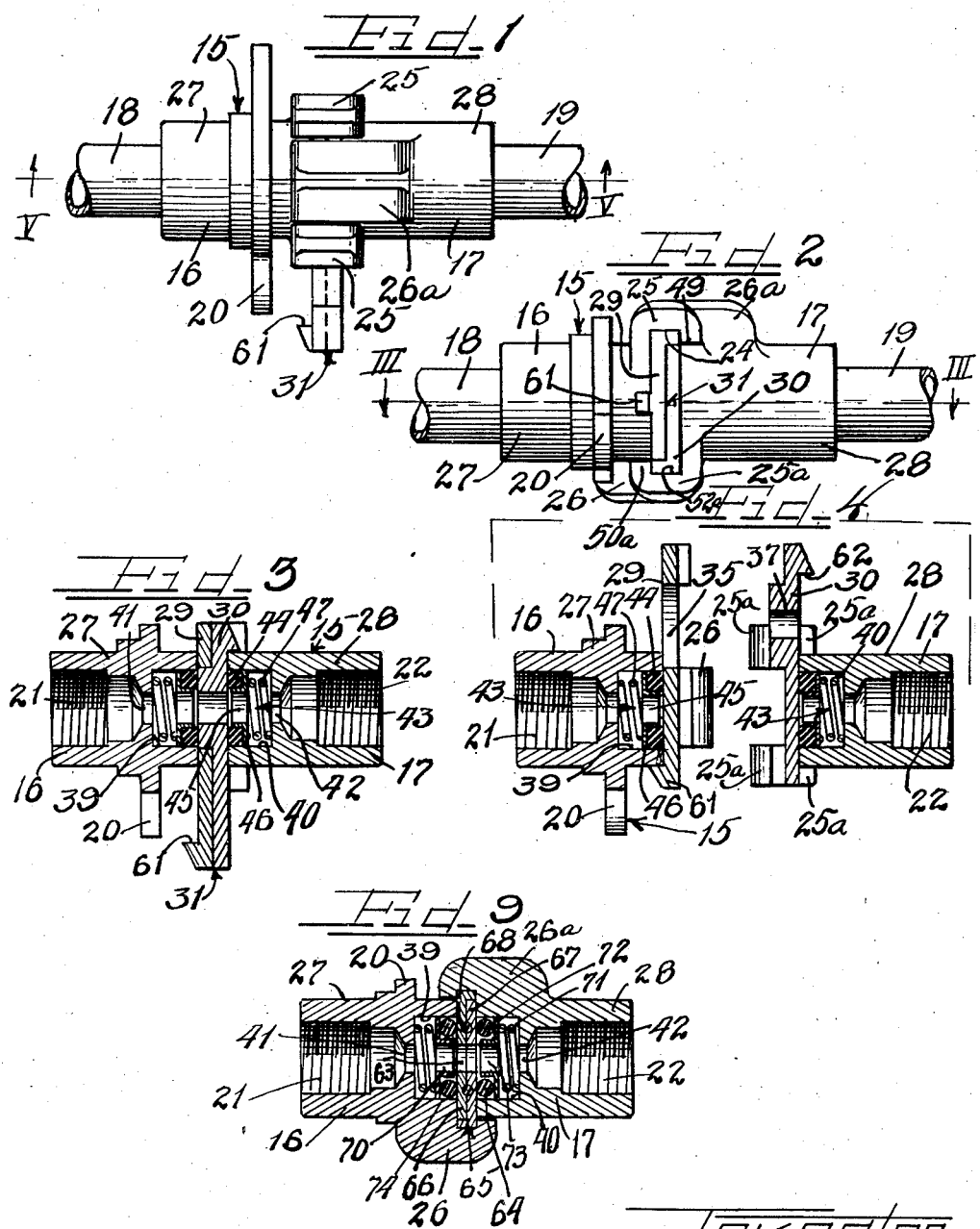
Inventor
Jacob Rush Snyder.
By Charles W. Hills Attys.

April 30, 1946.　　　J. R. SNYDER　　　2,399,516
QUICK DISCONNECT COUPLING
Filed Oct. 11, 1943　　　3 Sheets-Sheet 2
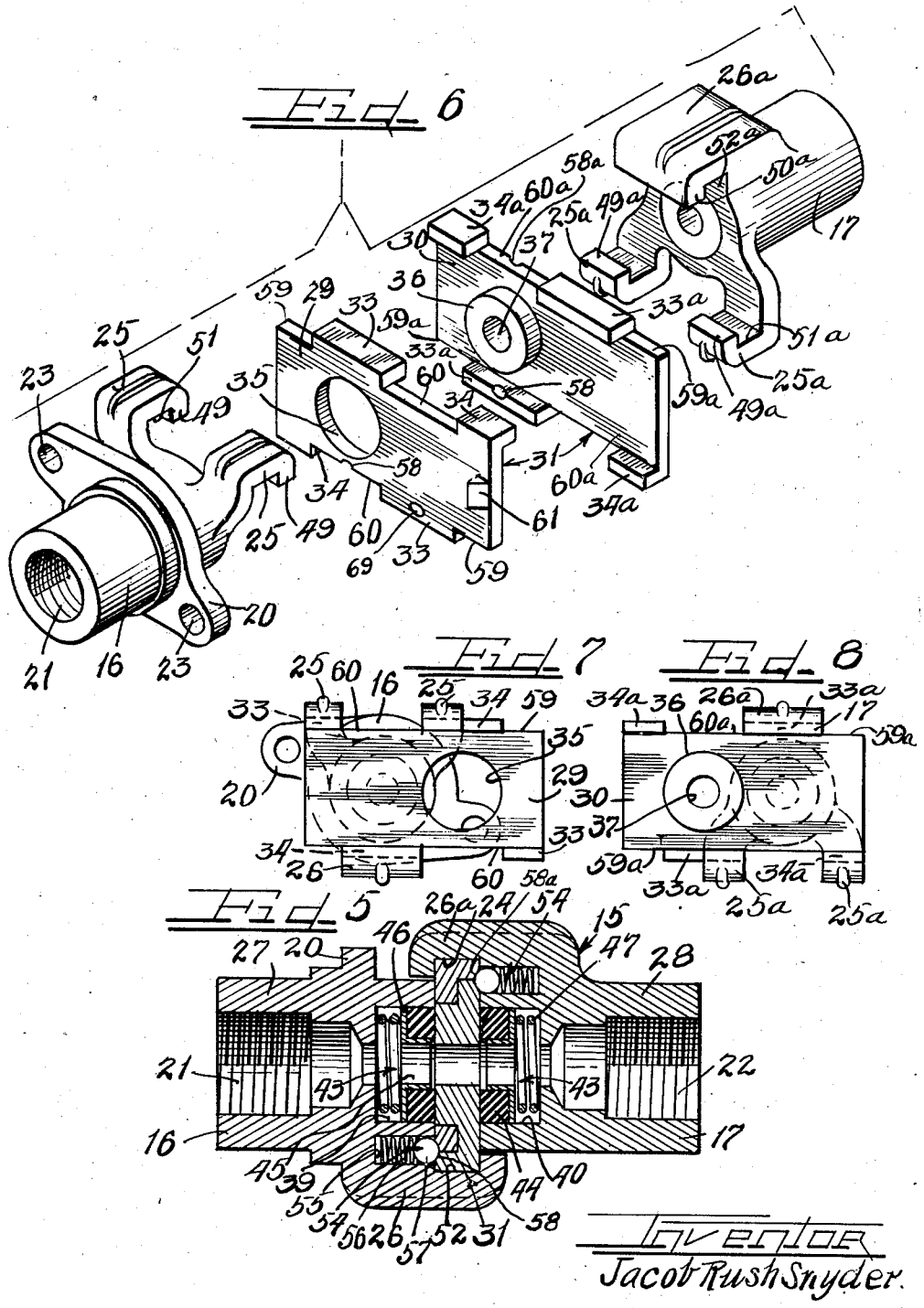

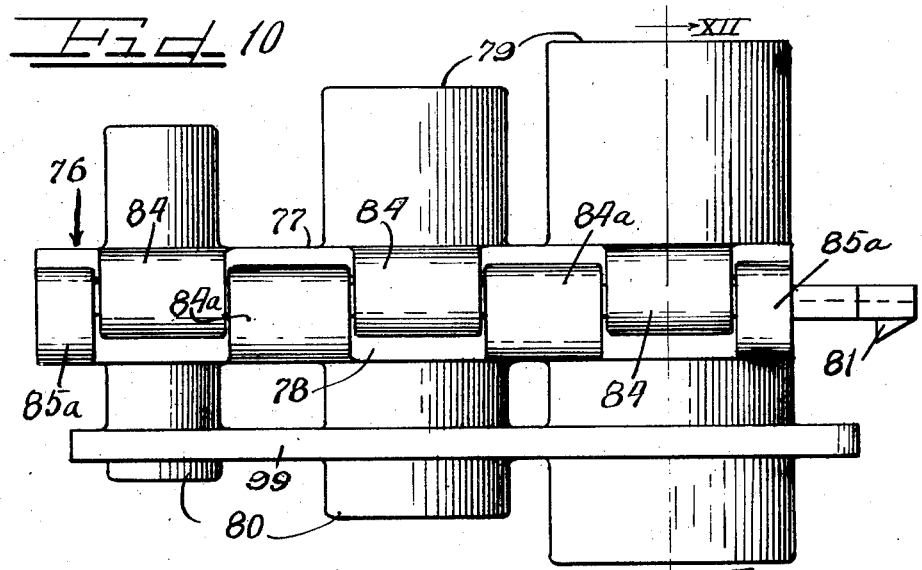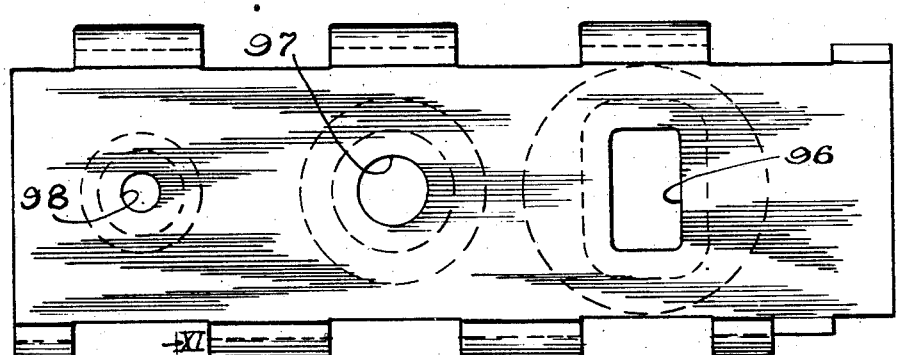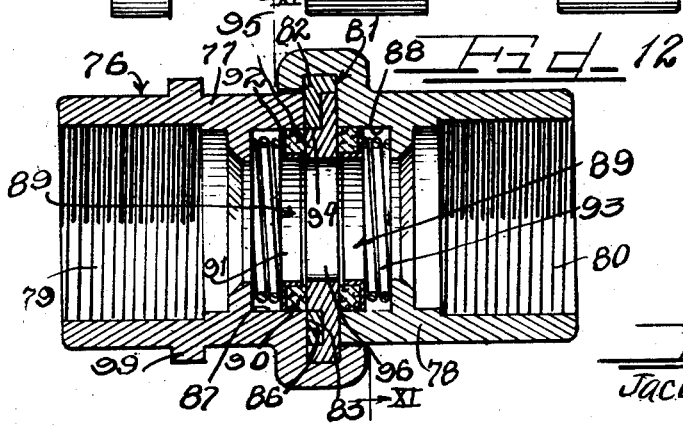

Patented Apr. 30, 1946

2,399,516

UNITED STATES PATENT OFFICE 2,399,516

QUICK DISCONNECT COUPLING

Jacob Rush Snyder, Cleveland, Ohio, assignor to Thompson Products, Inc., Cleveland, Ohio, a corporation of Ohio Application October 11, 1943, Serial No. 505,755

14 Claims. (Cl. 284—4)

This invention relates to self-sealing couplings adapted for quick and easy operation while automatically sealing the coupling parts when said coupling parts are detached from each other.

More particularly, the present invention relates to a device for coupling together the ends of fluid conduits such, for example, as tubes, pipes, hoses and the like, to place the same in unrestricted communication when coupled together and to seal the ends thereof when uncoupled.

According to the present invention, complementary coupling parts or boxes are adapted to receive the ends of fluid conduits which are to be placed in unrestricted fluid flow communication. A shiftable valve member comprising a multiple number of parts is provided to detachably connect the coupling boxes and to control fluid flow between the fluid conduits connected to said boxes. One of the parts of the valve members is retained in each of the coupling boxes for sealing the respective boxes when they are uncoupled to prevent leakage or drainage of the fluid out of the ends of the then separated fluid conduits.

The valve member may advantageously take the form of a slidably mounted member made up of a pair of interfitting plates which are adapted to cooperate with a plurality of mating fingers on each of the coupling boxes to connect the boxes together. One of said plates comprising said valve member is also to be retained to each of the boxes when the coupling boxes are detached. The coupling boxes cooperate to form a substantially rectangularly walled chamber therebetween at least two of the opposite sides of which are open to accommodate the slidably mounted valve member. Means are provided in each of the coupling boxes to aid in maintaining the positions of the several parts of the valve member with respect to the coupling boxes when connected or disconnected.

It is, thus, an object of the present invention to provide a detachable coupling unit having a valve member therein for placing the coupling boxes comprising the coupling unit in fluid flow communication and for sealing each coupling box when the coupling is broken.

Another object of the present invention is to provide a coupling unit employing a valve member made up of a multiple number of parts which co-act with the coupling boxes to lock the same in coupled relation and at the same time to provide a means for sealing the coupling boxes when the coupling is detached.

A further object of the invention is to provide a coupling unit which does not of necessity require distinct and separate male and female housing parts or left or right-hand parts, thereby simplifying not only the manufacture but reducing repair and replacement parts to a minimum.

A still further object of the present invention is to provide a coupling unit which does not require the use of special tools for connecting, disconnecting, assembling or disassembling the units.

Another important object of the present invention is to provide a coupling unit in which the valve members although being made up of a multiple number of parts provide an unrestricted passageway through several parts of the valve member without the necessity of providing sealing means therebetween for interconnecting the conduit to which the coupling boxes are secured.

It is a further object of the present invention to provide a slidable valve member for a detachable coupling unit which is made up of a plurality of mutually interfitting parts the cooperative portions of which co-act with means provided in or on the coupling boxes to hold each of the parts of the valve member in sealing relation in its associated coupling box when the coupling is broken.

It is a still further object of the present invention to provide a quick disconnect coupling unit which is simple in design, possesses all of the foregoing attributes and yet low in cost and high in functional efficiency.

The present invention also contemplates the provision of a coupling unit which will afford unrestricted fluid flow communication between the coupling boxes forming the unit that will not in any way effect a fluid pressure drop therebetween.

Still other features and objects of the invention will be apparent as the detailed description of the annexed sheets of drawings which illustrate preferred embodiments of the invention proceeds.

On the drawings:

Figure 1 represents a plan view of one form of quick disconnect coupling unit which embodies the principles of the present invention;

Figure 2 is a side elevation of the coupling unit illustrated in Figure 1;

Figure 3 is a horizontal cross-section taken along the line III—III in Figure 2;

Figure 4 corresponds generally to Figure 3 differing therefrom in that the coupling boxes comprising the coupling unit are illustrated in detached and sealed relation;

Figure 5 is a vertical cross-section taken substantially along the line V—V in Figure 1;

Figure 6 represents an isometric view of the coupling unit with the several parts disassembled but arranged in the order of their assembled relation;

Figures 7 and 8 represent end views of each of the coupling boxes comprising the coupling unit illustrated in Figure 1 in disassembled and sealed relation;

Figure 9 is a cross-section of another coupling unit which corresponds generally to Figure 5 but illustrates the application of a slightly different valve member and sealing arrangement therefor;

Figure 10 represents a plan view of a multiple detachable coupling unit embodying the principles of the present invention;

Figure 11 is an end view of one of the coupling boxes forming the coupling unit illustrated in Figure 10 and as seen from the line XI—XI in Figure 12; and Figure 12 is a vertical cross-sectional view substantially along the line XII—XII in Figure 10.

As shown on the drawings:

For purposes of illustration the principles of the present invention will be described first as related to the coupling unit 15 illustrated generally in Figures 1 and 2 of the drawings. The coupling unit 15 comprises a pair of coupling boxes 16 and 17 which are adapted to interconnect, in the manner hereinafter described, a pair of fluid conduits 18 and 19, respectively, which may be threaded or otherwise suitably secured to the ports 21 and 22 provided in the coupling boxes 16 and 17, respectively (see Figure 3). The coupling boxes 16 and 17 are preferably substantially identical in construction and design, however, coupling box 16 is illustrated as differing from coupling box 17 by virtue of the provision of a mounting flange 20 which is advantageously apertured as at 23 (Figure 6) for the reception of bolts or other suitable fastening means for securing the parts in an apparatus with which such a coupling unit may be advantageously employed.

In certain circumstances it may be expedient to omit any form of mounting means such as the flange 20 provided for the coupling box 16 in the illustrated embodiment. In this event, it will be apparent the parts 16 and 17, with the omission of the mounting means, would be identical, and the parts, simply by inverting the same, may be substituted one for the other. Such a feature presents distinct advantages, not only in simplifying the manufacture of the coupling unit, but also in providing replacement parts when the unit is in use in the field when both forms of coupling box may not be immediately available. The parts may, of course, in case of urgent necessity, be used interchangeably in spite of the presence or absence of flange 20 thereon.

The coupling boxes 16 and 17 are provided with a plurality of prong-like fingers 25, 26 and 25a, 26a, which are advantageously formed integrally with and project substantially radially from the body of the generally cylindrical body portion 27 and 28 of said coupling boxes 16 and 17, respectively. As will be apparent from Figures 2 and 5 of the drawings, the several fingers 25, 26, 25a, and 26a of coupling boxes 16 and 17, respectively, cooperate to enclose substantially completely all but two opposite sides of a generally rectangularly walled chamber 24 when the coupling boxes 16 and 17 are disposed in assembled relation. It will best be understood from Figures 2 and 6 that the chamber 24 is preferably open on at least two opposite sides thereof to receive the valve member 31 in slidable relation therein.

The valve member 31 is preferably made up of a plurality of interfitting parts, in the present instance, comprising the plates 29 and 30. The plate 29 is provided with a plurality of flanged portions 33 and 34 which may advantageously be formed integrally with the body of said plate and are disposed in alternately spaced relation along two of the opposite edges of said plate. Plate 30 is provided with a plurality of flanged portions 33a and 34a which correspond in general to the flanged portions 33 and 34 of the plate 29. The disposition of the flanged portions 33a and 34a on the plate 30 is such that they will cooperate with the spaces provided between the several flanged portions 33 and 34 on the plate 29 so that the two plates may be interfitted in the manner illustrated in Figures 1 and 2 of the drawings as will be readily apparent from the arrangement of the parts in Figure 6 of the drawings.

The plate 29 is provided with an aperture 35 extending therethrough and disposed substantially centrally of its lateral dimension but advantageously to one side of the midpoint of its longitudinal axis shown in Figures 6 and 7. The plate 30 of the valve member 31 is provided with a raised angularly shaped boss 36 disposed on one face thereof, preferably that toward which the flanged portions 33a and 34a project and is provided with a passageway 37 extending therethrough. The boss 36 on the plate 30 is positioned so as to register with the aperture 35 in the plate 29 when the plates 29 and 30 are interfitted and so disposed that the peripheral margins of the faces of the plates will coincide. The disposition of the plates 29 and 30 when placed in mated relation to form the valve member 31 will be clear from Figures 1 and 2 of the drawings.

A chamber 39 which may advantageously be of generally cylindrical form is provided in the face of the generally cylindrical body portion 27 of the coupling box 16 which is opposite to that in which the port 21 is formed having an opening 41 extending from its base to the base of the port 21. A similar chamber 40 is formed in the body portion 28 of the coupling box 17 and is likewise connected with the base of port 22 therein by an opening 42 in the base of said chamber 40. A sealing assembly 43 is disposed in each of the chambers 39 and 40 of the coupling boxes 16 and 17, respectively, and is adapted to be self-adjusting so as to prevent leakage of the fluid from each of said chambers between the outer surfaces of the plates 29 and 30 and the ends of said chambers as well as between the inner periphery of said chambers and said plates both when the coupling boxes 16 and 17 are in connected and disconnected relation to each other.

The sealing assemblies 43 are identical and comprise, in each instance, a generally annularly shaped sealing ring 44 internally of which is disposed the sleeve 45 having a flanged projection 46 which is adapted to overlay one face of the sealing ring 44. The flanged projection 46 forms a contacting surface for the compression coil spring 47 which is adapted to be positioned against the base of the chamber 39 or 40, as the case may be, so as to urge the sealing ring 44 against the outer face of the plate 29 or 30, whichever it may be, to prevent leakage therebetween both when the coupling boxes 16 and 17 are in connected and disconnected relation. The sealing assemblies 43 also serve to retain the plates 29 and 30 in contact with the fingers 25, 26 and 25a, 26a of the coupling boxes 16 and 17, respectively, when the coupling unit is disconnected. The sealing ring 44 may advantageously be formed of any suitable plastic or sealing material such, for example, as cork, rubber, synthetic rubber, neoprene and other similar resilient or plastic material.

As hereinbefore explained, the chamber 24 which is formed by the cooperative relation of coupling boxes 16 and 17 so that the fingers 25, 26 and 25a, 26a of said boxes are disposed in mating relation is adapted to slidably receive the interfitting plates 29 and 30 forming the valve member 31. The fingers 25 and 26 of the coupling box 16 are so formed that they will extend across the over-all thickness of the mated plates 29 and 30 of the valve member 31 so that the inwardly turned end portions 49 of the fingers 25 will cooperate with the inwardly turned portion 50 of the finger 26 to engage the outer or back surface of the plate 30 of the valve member 31. Similarly, the inwardly turned portion 49a of the fingers 25a and the like portion 50a of the finger 26a of the coupling box 16 contact the back or outer surface of the plate 29 of the valve member 31 when the parts are in assembled relation.

As will best be seen from Figures 7 and 8 of the drawings the over-all width of the flanged portions 33 and 34 of the plate 29 and the like portions 33a and 34a of the plate 30 corresponds closely to the base dimension of the grooves 51, 51a of the fingers 25, 25a as well as that of the grooves 52, 52a, of the fingers 26, 26a of the coupling boxes 16 and 17. Thus, when the coupling box 16 is detached from coupling box 17 of the coupling unit 15 as indicated in Figure 4 or in the Figures 7 or 8 of the drawings, the valve plates 29 and 30 will, in each case, be retained in their associated coupling boxes.

Assisting in the maintenance of the valve member 31 and its constituent plates 29 and 30 in their properly disposed relation, both when the coupling boxes 16 and 17 are connected and when they are disconnected, are the retaining means 54 associated with each of said coupling boxes 16 and 17. In each case, a retaining means 54 is disposed in a bore 55 formed in the face of the box adjacent the chamber 39 or 40 of the coupling box 16 or 17. The retaining means 54 comprises the coil spring 56 disposed in said bore 55 and adapted to urge a ball 57 against the plate or plates 29 or 30 of the valve member 31, depending upon whether or not the coupling unit 15 is assembled or disassembled to act as a position indicator for valve member 31.

The ball 57 of the retaining means 54 associated with coupling box 16 registers with a dimple 58 formed partly in the contiguous face of plate 29 and partly in the adjacent edge of the lowermost cooperating flanged portion 33a (as seen in Figure 6) of plate 30 of valve member 31 to indicate when the passageway 37 extending therethrough is in fluid flow communication with chambers 39 and 40 in coupling boxes 16 and 17, respectively. Contemporaneously, the like retaining means 54 in coupling box 17 registers with a similar dimple 58a (Figure 5) on the opposite face of valve member 31. Besides acting as a position indicator, the retaining means 54 in the coupling unit 15 operates to insure against the possibility of inadvertent or unauthorized shifting of the valve member 31 when the coupling boxes 16 and 17 are in fluid flow communication.

A dimple 69 on the outermost face of plate 29 of valve member 31 cooperates with the ball 57 of the retaining means 54 associated with the coupling box 16 to indicate when said plate is in sealing position with respect to the chamber 39 therein when the valve member is shifted in preparation for detachment of the parts of the coupling unit. A similar dimple (not shown) is advantageously formed on the plate 30 of valve member 31 in a position corresponding generally to that of dimple 69 on plate 29 and for a like purpose. Thus, when the coupling boxes 16 and 17 of coupling unit 15 are detached, the plates 29 and 30 are prevented from being inadvertently shifted from sealing position.

In assembling the coupling unit 15 of the present invention, the plate 29 is first inserted with flanged portions 33, 34 thereof registering with the grooves 51 and 52 in the fingers 25 and 26, respectively, of coupling box 16. The plate 29 is then positioned so that the aperture 35 is passed beyond the chamber 39 in said coupling box 16 until the stop 61 formed on the outer face of the plate 29 engages the cylindrical body 27 of the coupling box 16 as clearly illustrated in Figures 4 and 7 of the drawings.

Similarly, the plate 30 is slidably inserted in the grooves 51a and 52a of the fingers 25a and 26a, respectively, of the coupling box 17 and so positioned that the boss 36 is disposed laterally from the chamber 40 in said coupling box 17 as best illustrated in Figure 4 of the drawings. It will be noted that the stop 62 provided on the outer surface of the plate 30 does not, in this position, contact the cylindrical body portion 28 of the coupling box 17.

The edge portions 59 and 60 in the plate 29 which are disposed adjacent the flanged portions 33 and 34 of said plate are so formed that they correspond in width to that of the fingers 25, and 26, respectively, of the coupling box 16. In like manner, the corresponding edge portions 59a and 60a of the plate 30 of the valve member 31 will correspond in transverse dimensions to that of fingers 25a and 26a, respectively, of the coupling box 17. By virtue of the foregoing, and as will best be seen from Figure 4 of the drawings, when the coupling boxes 16 and 17 are detached, the chambers 39 and 40, respectively, of said couplings, are sealed by the blank portions of the plates 29 and 30, respectively. The plates are retained in place by cooperation of the flanged portions 33 and 34 of plate 29 with the fingers 25 and 26 of the coupling box 16 in addition to the co-action of flanged portions 33a and 34a with the fingers 25a and 26a of the coupling box 17 and urged outwardly against said fingers by the sealing assemblies 43 in the coupling boxes as illustrated in Figures 7 and 8.

When the parts of the detached couplings 16 and 17 are in the relation illustrated in Figure 4, it will be understood that the plates 29 and 30 as well as the several fingers 25, 26 of coupling box 16 and 25a, 26a of coupling box 17 will mate when said coupling boxes are placed together. The boss 36 of the plate 30 will, therefore, register with the aperture 35 in the plate 29, when said coupling boxes 16 and 17 are joined. After the coupling boxes 16 and 17 have been mated in the manner described above, the valve member 31 may thereafter be moved laterally so as to bring the passageway 37 in the boss 36 which extends through the aperture 35 into communication with the chambers 39 and 40 in the coupling boxes 16 and 17, respectively.

This lateral shifting of valve member 31 brings the flanged portions 33 and 34 of plate 29 into cooperative engagement with the fingers 25a and 26a of the coupling box 17. Contemporaneously, the flanged portions 33a and 34a of plate 30 of said valve member 31 are brought into registration with fingers 25 and 26 of the coupling box 16 to complete the interlocking engagement of the parts. Balls 57 of the retaining means 54 will also register with dimples 58 and 58a in the manner hereinbefore described. As will be apparent from Figure 3 of the drawings, the stop 61 on the plate 29 which was previously in contact with the cylindrical body 27 of the coupling box 16 will be out of contact therewith while the stop 62 formed on the plate 30 will thereafter be in contact with the cylindrical body portion 28 of the coupling 17.

The slidable valve member 31 of the coupling unit 15 which represents one of the preferred embodiments of the present invention is particularly advantageous for the reason that it is capable of being shifted with respect to the individual coupling boxes 16 and 17 without the use of any special tools. The coupling unit 15 may, therefore, be manipulated so as to interconnect or detach, as may be desired, the conduits 18 and 19 associated with said coupling boxes 16 and 17, respectively, without the use of a hand wheel, wrench, key, or other special tool of the sort customarily employed in conventional coupling units. Instead, the valve member 31 may be shifted by tapping it with a hammer or any other suitable implement at hand.

The embodiment of the invention illustrated in Figure 9 of the drawings corresponds substantially to the coupling unit 15 but differs therefrom principally in the method of sealing the valve member with respect to the several coupling boxes. In this instance, the coupling boxes 16 and 17 are associated with a valve member 65 comprising a pair of interfitting plates 66 and 67. Plate 66 is provided with an aperture 63 extending through one portion thereof and adapted to communicate with a similar aperture 64 in the plate 67 when the two plates forming the valve member 65 are mated in proper relation to interconnect the chambers 39 and 40 of coupling boxes 16 and 17, respectively. A suitable O ring seal 68 which may be formed of any suitable sealing material, such for example, as rubber, neoprene, or any of several resilient plastic materials may be affixed to the inner surface of one of the plates 66 or 67 by suitable adhesive so as to register with annular grooves surrounding the openings 63 and 64 and on the inner sides of the plates 66 and 67, respectively, so as to prevent leakage of the fluid passing through the communicating openings between the contiguous inner surfaces of the plates.

The sealing assembly 70 disposed in each of the chambers 39 and 40 of the coupling boxes 16 and 17, respectively, differs slightly from the sealing assembly 43 associated with the embodiment of the invention illustrated in Figures 1 to 8, inclusive. The sealing assembly 70, in each case, employs a sealing ring 74 in the form of an annulus which is associated with sleeve 73 having a flanged portion 72 and engaging the coil spring 71 for urging said sealing ring 74 into contact with the outermost faces of the plate 66 or 67, as the case may be.

Otherwise, the assembly and operation of the coupling unit illustrated in Figure 9 of the drawings corresponds to that of the embodiment of Figures 1 to 8, inclusive.

The embodiment of the invention illustrated in Figures 10 to 12, inclusive, employs the same general principles as that of the coupling unit 15. The coupling unit 76 differs from coupling unit 15, however, in that it embodies a plurality of tube connections thereby forming what is known as a multiple detachable coupling. The coupling unit 76 comprises generally coupling boxes 77 and 78 in which are formed a plurality of connections 79 and 80, respectively, which may all be of the same or different sizes to accommodate the connection therewith of a plurality of fluid conduits of the same or different sizes. The valve member 81 which is slidable in the coupling boxes 77 and 78, comprises a pair of interfitting plates 82 and 83.

As in the case of the coupling unit 15, the present coupling unit 76 is provided on the coupling box 77 thereof with a plurality of projecting fingers 84 and 85 which cooperate with identical fingers 84a and 85a formed on the coupling box 78 to form a substantially rectangularly walled chamber 86 open on at least two opposite sides thereof in which the valve member 81 is slidably engaged. The coupling boxes 77 and 78 of the coupling unit 76 may, as indicated in the foregoing description of the coupling unit 15, be identical in order that they may be interchanged if required, or the coupling box 78 may embody a mounting flange 99 suitably apertured for mounting the same in operating relation to the apparatus with which it is associated.

A chamber 87 of generally cylindrical form may be provided in the face of the coupling box 77 opposite the port 79 therein. A similar chamber 88 is formed in the face of the coupling box 78 opposite the port 80 therein. Associated with each of the chambers 87 and 88 of the coupling boxes 77 and 78, respectively, is a sealing assembly 89, which in each case comprises a sealing ring 90 in which is inserted a sleeve 91 having a flanged portion 92 thereon engaging a coil spring 93 which is positioned against the base of the chamber 87 or 88, as the case may be, to urge the sealing ring 90, into contact with the face of the valve plate 82 or 83.

As in the case of the embodiment illustrated in Figure 1 of the drawings, the instant embodiment of the invention contemplates the employment of an aperture 94 in plate 82 of the valve member 81 in which is inserted cylindrically shaped boss portion 95 formed on the plate 83 and surrounding a passageway 96 therein. The passageway 96 in the plate 83 interconnects the chambers 87 and 88 of the coupling boxes 77 and 78, respectively, and may be of any suitable form such, for example, as the rectangular cross-section illustrated in Figure 11. Passageways 97 and 98 which are illustrated as being circular and of smaller size than the passageway 96 interconnect associated chambers for each of the remaining pairs of ports disposed in the coupling boxes 77 and 78, respectively, of the coupling unit 76.

Sealing means similar to that hereinbefore described may be employed in connection with each of the chambers associated with each of the several remaining ports in the aforementioned coupling boxes 77 and 78. The mode of assembling and operation of the coupling unit 76 corresponds with that of the coupling unit 15.

It will, of course, be understood that various details of construction may be varied through a wide range without departing from the principles of this invention and it is, therefore, not the purpose to limit the patent granted hereon otherwise than necessitated by the scope of the appended claims.

What I claim is:

1. A detachable coupling for interconnecting a plurality of conduits for the flow of fluid therethrough comprising a pair of passaged coupling boxes, said coupling boxes having mating fingers thereon, a pair of plates slidably mounted between the mating fingers in the coupling boxes, said plates having interfitting flanged portions adjacent their contiguous faces to detachably connect said coupling boxes in fluid flow communication, said flanged portions on each plate coacting with the fingers on the coupling box associated therewith to retain the plates therein upon detachment of said coupling boxes.

2. In a detachable coupling for interconnecting a plurality of conduits for the passage of fluid therethrough, a pair of coupling boxes having oppositely disposed alternately arranged mating means thereon and fluid ports therein, and a shiftable member for cooperation with said coupling boxes for alternately interconnecting the ports for fluid flow communication and disconnecting and sealing said ports, said shiftable member comprising a pair of interfitting parts, means associated with each of the parts to locate said parts in mutually interfitted relation, an aperture in one of said parts, and passage defining means in the other of said parts for engagement with the aperture in the first mentioned part to interconnect the ports in the coupling boxes when said coupling boxes are disposed in interlocking arrangement.

3. In a detachable coupling for interconnecting a plurality of conduits for the passage of fluid therethrough, a pair of coupling boxes having oppositely disposed alternately arranged mating means thereon and fluid ports therein, and a shiftable member for cooperation with said coupling boxes to alternately interconnect the ports for fluid flow communication and to disconnect and seal said ports, said shiftable member comprising a pair of plates, each of which is provided with a plurality of spaced flanged portions interfitting with alternately disposed flanged portions on the other of said plates, an aperture in one of said plates, a passage defining means in the other of said plates for registration with the aperture in the first-mentioned plate, said aperture and said passage defining means interconnecting the ports in said boxes when the several parts are assembled together.

4. In a multi-part detachable coupling for establishing fluid flow communication between a plurality of conduits, a shiftable member for alternately connecting the parts of said coupling together and sealing said parts against leakage of fluid therefrom when disconnected, said member comprising a pair of plates, one of said plates being apertured and having a plurality of flanged portions thereon, the other of said plates having a corresponding number of flanged portions which interfit with the flanged portions on the first-mentioned plate, and passage defining means on the second of said plates for registration with the aperture in the first-mentioned plate.

5. In a multi-part detachable coupling for establishing fluid flow communication between a plurality of conduits, a shiftable member for alternately connecting the parts of said coupling together and sealing said parts against leakage of fluid therefrom when disconnected, said member comprising a plurality of plates, at least one of which has an aperture therein and a plurality of flanged portions adjacent the edges thereof, another of said plates having similar flanged portions thereon arranged to interfit in alternating relation with the flanged portions on the first of said plates when the plates are assembled in contiguous relation, a boss on the second of said plates registering with the aperture in the first plate to define a fluid passageway therethrough.

6. A detachable coupling comprising a pair of substantially identical ported coupling boxes which when assembled form a substantially rectangularly walled chamber open on at least two opposite sides thereof, each of said coupling boxes having a plurality of fingers extending therefrom which mate with a corresponding number of fingers on the other of said coupling boxes, a multi-part slide valve for alternately interconnecting and sealing the ports in said coupling boxes, and means in each of the coupling boxes for maintaining the relationship of the parts of said slide valve with the fingers of the coupling boxes both when the coupling boxes are assembled and when they are detached from one another.

7. A detachable coupling for connecting a plurality of conduits in fluid flow communication and sealing the same when disconnected comprising a pair of passaged coupling boxes, said coupling boxes being provided with a plurality of mating fingers, a member including a plurality of interfitting parts slidable in the mating fingers of the coupling boxes, a passageway extending through said slidable member for connecting the passages of the coupling boxes, flanged portions on each of the parts of the slidable member for cooperating with similar portions on the other of said parts to provide interfitting engagement of the parts when the coupling boxes are connected and coacting with the fingers of the associated coupling box to seal the same when the coupling boxes are disconnected, and means in said coupling boxes for engaging the slidable member to retain the parts thereof in engagement with the fingers on the coupling boxes both in connected and disconnected relation.

8. A detachable coupling for connecting a plurality of conduits in fluid flow communication and sealing the same when disconnected comprising a pair of passaged coupling boxes, said coupling boxes being provided with a plurality of mating fingers, a member including a plurality of interfitting parts slidable in the interlocking fingers of the coupling boxes, a passageway extending through said slidable member for connecting the passages of the coupling boxes, flanged portions on each of the parts of the slidable member for cooperating with similar portions on the other of said parts to provide interfitting engagement of the parts when the coupling boxes are connected and coacting with the fingers of the associated coupling box to seal the same when the coupling boxes are disconnected, means in said coupling boxes for engaging the slidable member to retain the parts thereof in engagement with the fingers on the coupling boxes both in connected and disconnected relation, and stop means on each of the parts of the slidable member for positioning the same with respect to said coupling boxes.

9. In a detachable coupling for interconnecting a plurality of conduits for the passage of fluid therethrough, a pair of coupling boxes having oppositely disposed, alternately arranged mating means thereon and fluid ports therein, and shiftable means for cooperation with said coupling boxes for alternately interconnecting the ports for fluid flow communication and disconnecting and sealing said ports, said shiftable means comprising a pair of interfitting parts, means associated with each of the parts to locate said parts in mutually interfitted relation, a passageway extending through said parts for interconnecting the ports in the coupling boxes, and stop means on each of the parts of the shiftable member for positioning the same with respect to said coupling boxes.

10. A coupling comprising a pair of detachably connected coupling boxes defining a conduit for fluid communications therebetween, a multi-part shiftable member for connecting said coupling boxes and sealing the same when the parts are detached, said shiftable member having a passaged portion and a sealing portion therein, and retaining means between said coupling boxes and said shiftable member for positioning the parts of the shiftable member in engagement with the coupling boxes when the parts are connected and disconnected.

11. A coupling comprising a pair of detachably connected coupling boxes defining a conduit for fluid flow communication therebetween, a slidable member including a pair of flanged plates for connecting said coupling boxes and sealing the same when the boxes are detached, each of said plates of said slidable member having apertures therein for registration with the conduits formed by the coupling boxes and an adjacent sealing portion for closing said conduits, retaining means between said coupling boxes and said plates of the slidable member for positioning the plates in engagement with the coupling boxes when the parts are connected and disconnected, and sealing means disposed between the plates of the slidable member to prevent leakage of fluid therebetween.

12. In a coupling, a pair of ported coupling boxes each slidably supporting an apertured slide for covering and uncovering the ports, and means cooperating with the slides to connect the boxes when the slides are moved to port uncovering position.

13. A detachable coupling comprising a pair of ported coupling boxes each having supports thereon, and a plurality of apertured members at least one of which is shiftably mounted in the supports of each coupling box for covering and uncovering the port in said coupling box, each of said members having means thereon which mutually interfit with the similar means on the other of said members and engage the supports of the coupling box mounting the other member to lock said coupling boxes together when the ports in said boxes are uncovered and which disengage said supports to disconnect said coupling boxes and disassemble said apertured members from each other when the ports in said boxes are covered.

14. A detachable coupling comprising a pair of ported coupling boxes each having slide supports thereon, an apertured slide shiftably mounted in each slide support to cover and uncover the port in said coupling box, and flanged portions on said slides which mutually interfit to provide engagement of the slide of each coupling box with the slide supports in the other coupling box for locking the same together when the interfitted slides are positioned with the apertures therein in fluid flow communication with the ports in said coupling boxes, said flanged portions of the slide of one coupling box disengaging the slide supports of the other coupling box and engaging the supports of said one coupling box when said slide is shifted to disconnect said coupling boxes, whereby each of the slides seals the ports in the box in which it is mounted.

JACOB RUSH SNYDER.